United States Patent
Guo et al.

(10) Patent No.: US 12,001,535 B2
(45) Date of Patent: Jun. 4, 2024

(54) VEHICLE CONTROL PANEL WITH PASSENGER DETECTION FOR FUNCTION ENABLEMENT

(71) Applicant: FORD GLOBAL TECHNOLOGIES, LLC, Dearborn, MI (US)

(72) Inventors: Biaohe Guo, Northville, MI (US); Mark W. Larry, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 258 days.

(21) Appl. No.: 17/665,827

(22) Filed: Feb. 7, 2022

(65) Prior Publication Data

US 2023/0252117 A1 Aug. 10, 2023

(51) Int. Cl.

| | |
|---|---|
| *G06F 21/32* | (2013.01) |
| *B60K 35/00* | (2006.01) |
| *B60N 2/00* | (2006.01) |
| *G06V 40/12* | (2022.01) |
| *G06V 40/50* | (2022.01) |
| *B60K 28/06* | (2006.01) |
| *B60K 35/10* | (2024.01) |

(Continued)

(52) U.S. Cl.
CPC ............ *G06F 21/32* (2013.01); *B60K 35/00* (2013.01); *B60N 2/002* (2013.01); *G06V 40/1365* (2022.01); *G06V 40/50* (2022.01); *B60K 28/063* (2013.01); *B60K 35/10* (2024.01); *B60K 35/29* (2024.01); *B60K 35/65* (2024.01); *B60K 2360/141* (2024.01); *B60K 2360/1434* (2024.01); *B60K 2360/197* (2024.01); *B60K 2360/741* (2024.01); *B60R 25/25* (2013.01); *B60R 25/252* (2013.01)

(58) Field of Classification Search
CPC ....... G06F 3/147; B60K 28/063; B60K 37/02; B60R 25/252; B60R 25/25
See application file for complete search history.

(56) References Cited

U.S. PATENT DOCUMENTS 6,271,745 B1 * 8/2001 Anzai .................. G07C 9/37
340/5.23
9,477,332 B2 10/2016 Cuddihy et al.
(Continued)

FOREIGN PATENT DOCUMENTS

JP 2009252105 A 10/2009

*Primary Examiner* — Barbara B Anyan
(74) *Attorney, Agent, or Firm* — Frank L. Lollo; MacMillan, Sobanski & Todd, LLC

(57) ABSTRACT

The invention is an apparatus used for providing control of functions of a vehicle in response to touch commands of an authorized passenger. The functions for which the authorized passenger is provided control are disallowed to the driver when the vehicle is moving. The passenger is authorized with two-factor authentication. The first of the two factors is the fingerprint of the passenger which is enrolled before vehicle movement. The second factor is the location of the passenger. The first factor is used when an occupant attempts to control disallowed functions. The second factor is used when an occupant attempts to enroll a fingerprint. A display panel displays a prompt to enroll a fingerprint before vehicle movement, uses a fingerprint interface to enroll an original fingerprint, and instantaneously captures fingerprints of those attempting to control disallowed functions and compares them to enrolled fingerprints.

18 Claims, 4 Drawing Sheets

(51) Int. Cl.
*B60K 35/29* (2024.01)
*B60K 35/65* (2024.01)
*B60R 25/25* (2013.01)

(56) References Cited

U.S. PATENT DOCUMENTS

| | | | |
|---|---|---|---|
| 10,474,357 B2 | 11/2019 | Bouaziz | |
| 10,727,286 B2 | 7/2020 | Chang et al. | |
| 2002/0048391 A1* | 4/2002 | Kim | B60R 25/252 |
| | | | 382/124 |
| 2004/0214596 A1* | 10/2004 | Lee | H04M 1/006 |
| | | | 455/552.1 |
| 2008/0252412 A1* | 10/2008 | Larsson | B60R 25/25 |
| | | | 340/5.2 |
| 2009/0082951 A1 | 3/2009 | Graessley | |
| 2012/0245763 A1* | 9/2012 | Mizuno | B60K 28/063 |
| | | | 701/1 |
| 2019/0315230 A1 | 10/2019 | Riegel et al. | |
| 2020/0086881 A1* | 3/2020 | Abendroth | G10L 17/00 |
| 2020/0118422 A1* | 4/2020 | Demisse | G08G 1/017 |
| 2020/0371601 A1* | 11/2020 | Iio | B60K 37/02 |
| 2021/0255764 A1* | 8/2021 | Tanabe | G06F 3/147 |

\* cited by examiner

VEHICLE CONTROL PANEL WITH PASSENGER DETECTION FOR FUNCTION ENABLEMENT

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

Touchscreen display panels in vehicles provide centralized controls which respond to touching of the screen in order to access menus for adjustments and/or data entry. Accessing or adjusting certain systems and functions of vehicles have been disabled to drivers when the vehicle is moving in order to reduce distractions. For example, a vehicle navigation system using GPS locations and maps to provide route planning and guidance include user actions that can be taken by a driver while moving, such as adjusting a map view. However, other actions such as inputting an address for a route destination usually requires that the vehicle be motionless to ensure that a driver does not perform this task while moving.

When a passenger is present, it may be desirable to enable the functions which are denied to the driver to be accessible to the passenger. However, a determination of which vehicle occupant is operating the touchscreen display panel needs to be made. An existing method for detecting which occupant is touching the touchscreen display panel uses proximity sensors, such as ultrasonic detectors. However, incorporating a system to use proximity sensors in the vehicle interior may not have the desired reliability and accuracy by themselves. Another method uses signal modulation devices which pass unique signals from the occupant seats through the occupants to the touchscreen display which can be detected to identify where the active user is seated. However, these may have disadvantages relating to system cost, long term reliability, and consistency of performance.

Fingerprint sensors associated with a touchscreen display screen have been used to limit access to touchscreen functions according to specifically identified individuals, but knowing the identity of a person accessing the touchscreen would usually not ensure that the person was not in the driver seat.

SUMMARY OF THE INVENTION

The present invention relates in general to passenger availability of driver-restricted functions via a vehicle display panel. More specifically, the invention provides control of vehicle functions, operated by use of a display panel, to a vehicle passenger (i.e., non-driver) that has been identified and localized to the passenger seat before vehicle motion.

The present invention uses two-factor authentication in order to authorize an occupant and ensure this occupant is not the driver. The first of the two factors depend on a fingerprint of an occupant. The invention is equipped with a fingerprint interface integrated into the display panel which captures fingerprints for enrollment before vehicle movement and, thereafter, captures instantaneous fingerprint data as anyone is operating the display panel. The second factor in the two-factor authentication is a detection sensor which ensures that the occupant attempting to enroll their fingerprint (or subsequently attempting to access a restricted menu function) is sitting in a passenger seat. The detection sensor does this by detecting the seat location of an active user during fingerprint enrollment. Enrollment is completed before the vehicle is moving.

When the vehicle starts moving, functions that have been predetermined to be disabled for the driver become operational when accessed using the enrolled fingerprint. Any finger may potentially interact with the display panel when the vehicle is moving. However, the predetermined functions will only respond if a passenger fingerprint was enrolled, and an instantaneous fingerprint data matches the enrolled fingerprint. The enrolled fingerprint will unenroll when the passenger leaves the passenger seat, or the vehicle is turned off.

DETAILED DESCRIPTION OF PREFERRED EMBODIMENTS

The invention involves providing control of functions of a vehicle to an authorized passenger. These functions are disallowed to a driver while the vehicle is moving. To control the predetermined disallowed functions, a fingerprint in contact with a display panel must match an enrolled fingerprint. This fingerprint is enrolled before vehicle motion, ensuring that the driver is not using the disallowed functions. A detection sensor monitors fingerprint enrollment to ensure that an occupant seated in a passenger seat is the source of the fingerprint. The option to enroll will not present itself unless an occupant is detected in the passenger seat. The enrolled fingerprint is unenrolled when the passenger exits the passenger seat. An array of layers is present on an exterior face of the display panel. One of these layers is a fingerprint interface which allows fingerprint enrollment as well as the collection of instantaneous fingerprint data for comparison during normal operation.

Figure 1:
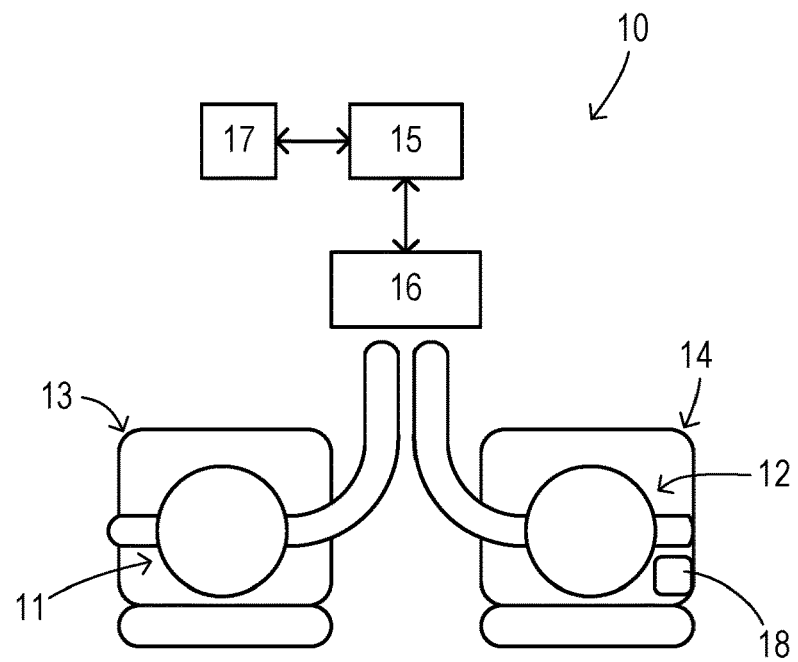
FIG. 1 is a schematic view of a vehicle interior which includes occupants and their use of a display panel connected to a controller.

FIG. 1 shows an interior of a vehicle 10 which has a driver seat 13 and a passenger seat 14. Driver seat 13 is occupied by a driver 11 and passenger seat 14 is occupied by a passenger 12. An occupant sensor 18 in passenger seat 14 determines when passenger 12 is sitting or has exited the seat. Also, within the interior of the vehicle, a controller 15 is connected to a touchscreen display panel 16 and data memory 17. Display panel 16 includes a fingerprint interface 31 (FIG. 3) capable of scanning a fingerprint. These scans can be transferred by controller 15 to data memory 17. A right arm/hand of driver 11 is typically used to manipulate touchscreen display panel 16, and a left arm/hand of passenger 12 is typically used to manipulate touchscreen display panel 16. In any event, the arm/hand of driver 11 approaches touchscreen 16 from a driver side of vehicle 10 and the arm/hand of passenger 12 approaches touchscreen display panel 16 from a passenger side of vehicle 10, which can be monitored using various kinds of known sensor arrangements.

Figure 2:
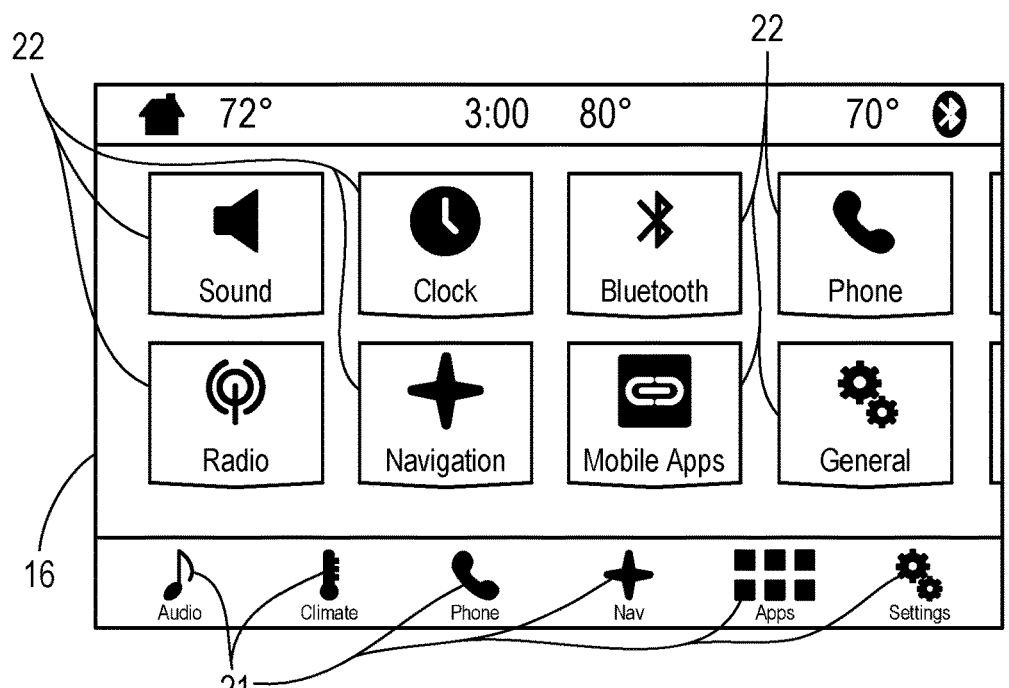
FIG. 2 is a screen shot showing contents of the display panel.

FIG. 2 shows display contents on touchscreen display panel 16. A main menu for accessing controllable functions may include static selection areas 21 in order to continuously provide shortcuts for accessing main systems or accessories. Touchscreen display panel 16 further provides sub-menu selection areas 22 which may change dynamically by navigating through the menus. When the vehicle is in motion, movement through the menu functions may depend upon groupings of functions into those that may be always available and those that can be operated only by the enrolled passenger. In order to operate these restricted functions while moving, fingerprint interface 31 (FIG. 3) will capture instantaneous fingerprint data of any finger touching touchscreen display panel 16 and compare it to enrolled fingerprint data. A request for a restricted function will only be executed if the instantaneous fingerprint data matches enrolled fingerprint data. Unrestricted functions will not have any authentication requirements and therefore can be used freely.

Figure 3:
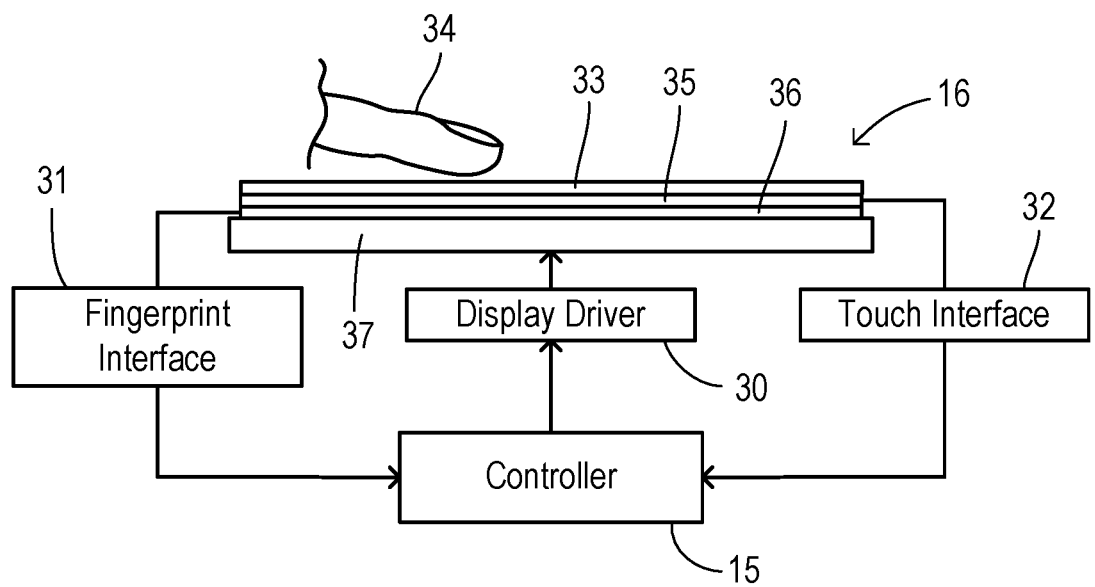
FIG. 3 is a side view of the display panel connected to a block diagram showing an array of layers in the display panel.

FIG. 3 depicts a finger 34 interacting with display panel 16. Display panel 16 has an array of layers including a cover layer 33, a touch sensitive layer 35 (e.g., a capacitive matrix), a fingerprint detection layer 36 (e.g., an image capture layer), and a light emitting (e.g., LCD OR OLED) display matrix layer 37. Touch sensitive layer 35 is connected to a touch interface 32, and fingerprint detection layer 36 is connected to a fingerprint interface 31. Cover layer 33 can be comprised of a transparent material including glass or plastic. Touch interface 32 determines a point of contact where a finger touches the screen in order to activate menu functions 21 and sub-menu functions 22 as well as other functions such as scrolling. Fingerprint interface 31 may utilize an optical detector or method, a capacitive detector or method, or an ultrasonic detector or method to capture fingerprint data of a finger interacting with display panel 16 as known in the art using commercially available devices. Other methods may also be used to detect fingerprints. Touch interface 32, fingerprint interface 31, and a display driver 30 are connected to controller 15. Display driver 30 drives the presentation of the menu selections and other information onto touchscreen display panel 16.

Figure 4:
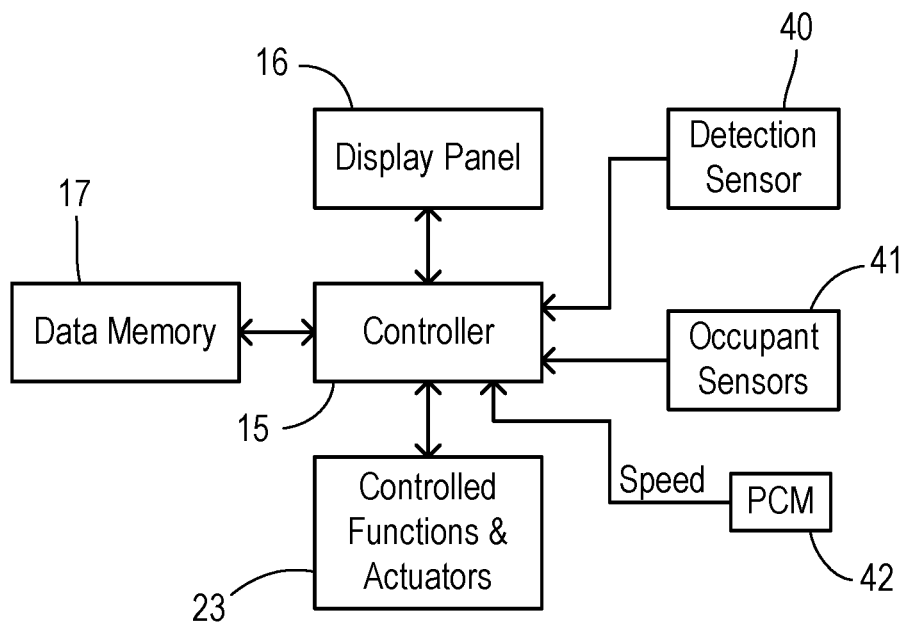
FIG. 4 is a block diagram showing inputs and outputs of the controller.

FIG. 4 depicts interactions of controller 15 with other vehicle components. The controller 15 can receive stored data signals from memory 17, touch signals from touchscreen display panel 16, occupant location signals from a detection sensor 40, occupancy sensor signals from occupant sensors 18, and vehicle and/or wheel speed signals from a powertrain control module (PCM) 42 or other module (i.e., to determine a moving or stationary state of the vehicle). Controller 15 is also connected to controlled functions and/or actuators 23 which carry out the commanded actions selected by a user via the touchscreen menus. Detection sensor 40 performs occupant sensing in a manner that determines whether a finger interacting with touchscreen display panel 16 corresponds to the driver or the passenger. For example, detection sensor 40 may be comprised of a camera, interior radar sensors, or ultrasonic sensors. Since differentiation between the driver and passenger may be subject to occasional errors or deception, the two-factor authentication of the invention using fingerprint enrollment may provide a more robust determination of the seating position of a user that accesses the touchscreen.

When the vehicle is started and occupant sensor 18 in the passenger seat detects a seated occupant, fingerprint enrollment is initiated prior to vehicle movement by prompting the passenger to contact the touchscreen with a fingerprint. When the passenger contacts touchscreen display panel 16 with a finger, detection sensor 40 is used to detect whether the origin of the finger is via an arm/hand which corresponds to the passenger. Thus, a finger contacting touchscreen display panel 16 can be traced by detection sensor 40 back to an origin point corresponding to either the driver seat or passenger seat. If the origin point of the fingerprint is the passenger seat, then fingerprint data received via fingerprint interface 31 (FIG. 3) is saved into data memory 17 by controller 15 as enrolled fingerprint data. When the vehicle is turned off, or when occupant sensor 18 in the passenger seat no longer senses an occupant, any enrolled fingerprint data will be deleted from data memory 17.

Figure 5:
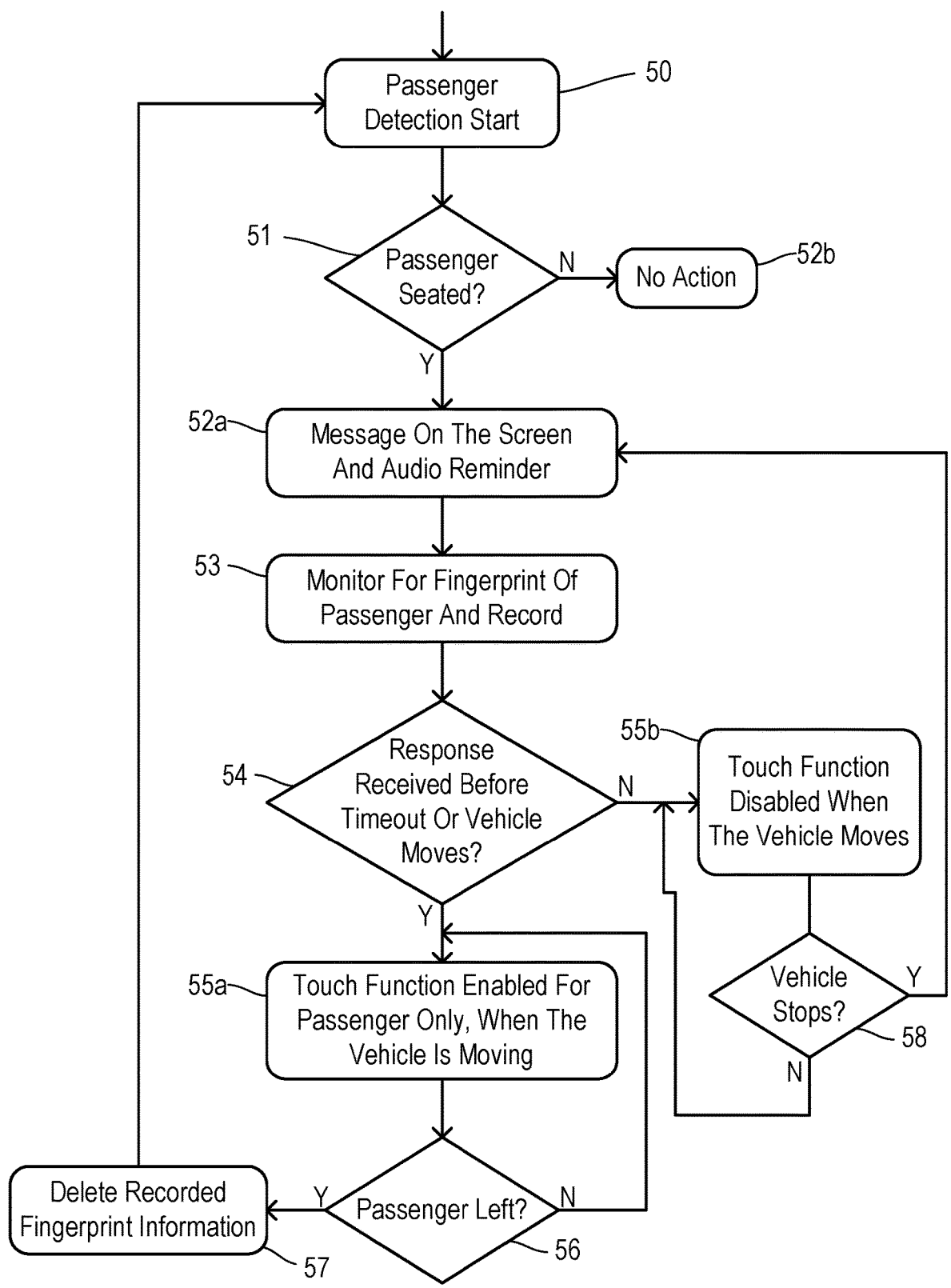
FIG. 5 is a flowchart showing one exemplary embodiment of a method to detect a passenger and enroll and unenroll a passenger fingerprint.

FIG. 5 shows a flowchart describing one preferred method. Step 50 is the beginning of passenger detection. In step 51, an occupant sensor in the passenger seat is used to determine whether a passenger is in the seat. If a passenger is not detected in the passenger seat, step 52b indicates no action will be taken. If a passenger is detected in the passenger seat, then the display panel will display a message in step 52a to prompt the passenger to touch the touchscreen in order to enroll their fingerprint. An audio prompt can also be played using an audio system of the vehicle. The message may include a reminder to the passenger that enrollment of a fingerprint will no longer be available when the vehicle starts moving. In step 53, the fingerprint interface monitors for a fingerprint. If a fingerprint is obtained from a finger that is in contact with the display panel, the detection sensor is utilized as a second factor of authentication in order to ensure that the fingerprint being received corresponds to the occupant of the passenger seat. In step 54, a determination is made as to whether a response in the form of a fingerprint was received from the passenger before timeout and that the fingerprint has been recorded. Timeout occurs when the vehicle starts moving or after a predetermined amount of time lapses after the prompting message. If no response was received before timeout, step 55b ensures that touch functions for disallowed functions remain disabled for all occupants while the vehicle is moving. When the vehicle stops, however, the method may return to step 52a to provide another opportunity for the seated passenger to perform fingerprint enrollment.

When step 54 determines that the fingerprint of the passenger has been enrolled, then the functions that are disallowed to the driver while the vehicle is moving can be made available to the passenger with the enrolled fingerprint in step 55a. In step 56, the occupant sensor is used to determine whether the passenger is no longer in the passenger seat. If the passenger is no longer seated, the recorded fingerprint is deleted from enrollment in the memory in step 57.

Figure 6:
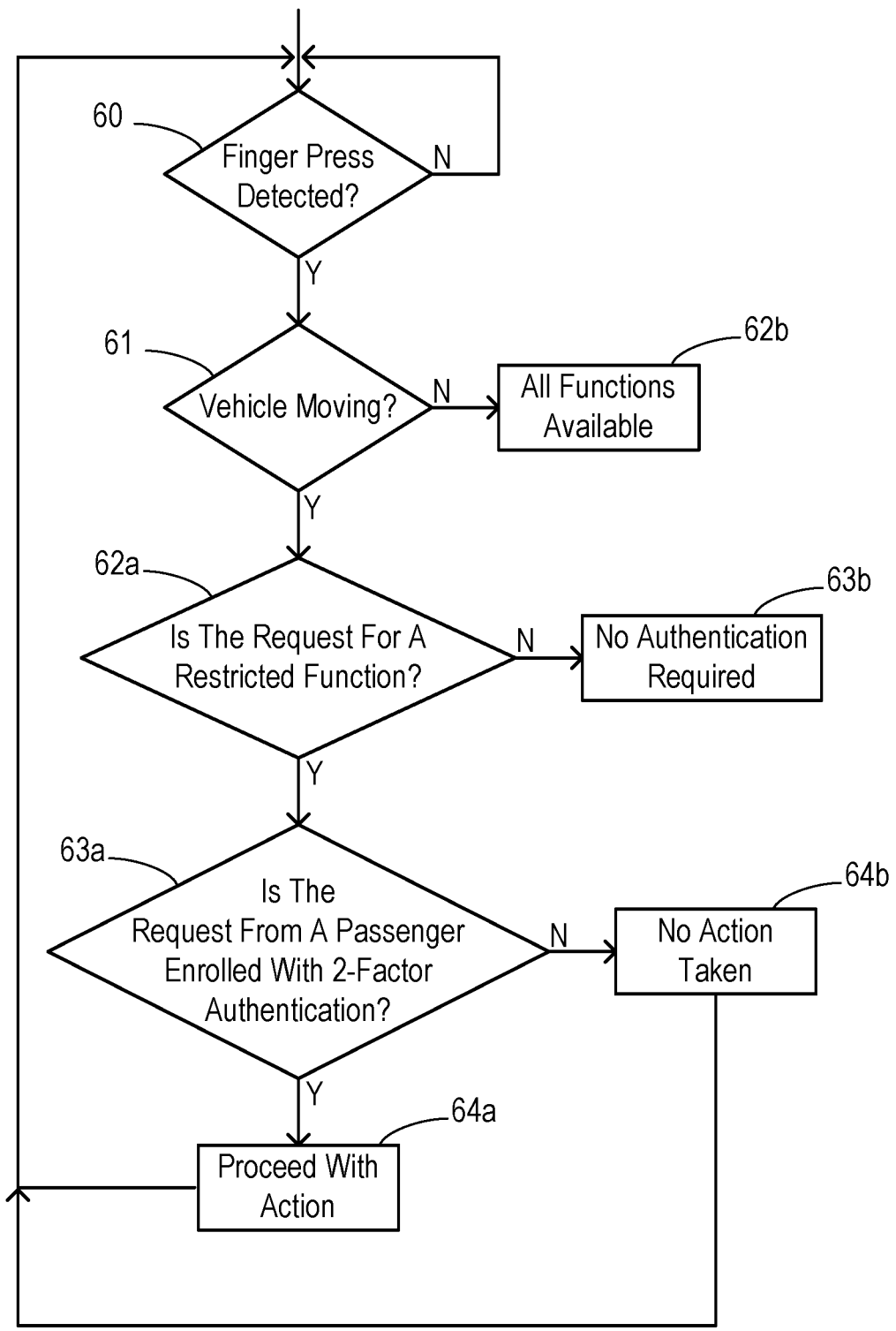
FIG. 6 is a flowchart showing one exemplary embodiment of a method of processing user entries on a touchscreen display panel while driving.

FIG. 6 shows a flowchart describing one preferred method for operating the touchscreen display panel and control system. In step 60, a determination is made as to whether a finger press is detected. If not, the touch interface will remain alert for potential finger presses. Once the touch interface detects a finger press, a determination is made in step 61 as to whether the vehicle is moving. If the vehicle is not moving step 62b shows that all functions are available.

If the vehicle is moving, then a determination is made in step 62a as to whether a touch request corresponds to a restricted function. If the function that is requested for use is not a potentially disallowed function, then the corresponding action is performed in step 63b since there is no authentication required in order to operate that function. If the request is for a disallowed function, then a determination is made in step 63a as to whether the fingerprint of the requestor matches the enrolled fingerprint of the passenger. To determine this, the instantaneous fingerprint data of the requester will be compared to enrolled fingerprint data. If there is no match, then no action is taken in step 64b (e.g., the action is skipped). If there is a match, then the requester is determined to be the authorized passenger with a fingerprint enrolled in accordance with the two-factor authentication of this invention. Therefore, the vehicle will proceed with the action that the passenger requested. Finally, a return is made to step 60 to process additional user actions.

Fingerprint enrollment may be adapted to be performed at various times or circumstances. Each time the vehicle is started up, any enrolled fingerprints from previous trips are already deleted from memory, and the apparatus prompts a passenger to enroll a fingerprint, if desired. A fingerprint can also be enrolled by the passenger at later times when the vehicle stops. A vehicle stop may be detected by the powertrain controller. For example, if the vehicle comes to a temporary stop while the transmission remains in drive, enrollment of a fingerprint by the passenger may be prompted for and accepted. If the driver and passenger were to switch seats during a temporary vehicle stop, the enrolled fingerprint of the person moving from the passenger seat to the driver seat would be deleted in response to the passenger seat going empty. A new passenger enrollment in FIG. 5 would start when a new passenger sat down.

What is claimed is:

1. A vehicle apparatus for providing control of functions of a vehicle in response to touch commands performed by users in a passenger seat and a driver seat in the vehicle, wherein the functions include actions which are disallowed to a driver when the vehicle is moving, the vehicle apparatus comprising:
 a display panel responsive to touching by the users to generate the touch commands, wherein the display panel is configured to instantaneously capture fingerprint data of a finger which interacts with the display panel when generating the touch commands while the vehicle is moving;
 a sensor configured to detect whether one of the users interacting with the display panel is seated in the passenger seat; and
 a controller configured to A) enroll passenger fingerprint data of the one of the users located in the passenger seat prior to initiation of driving of the vehicle, B) receive a touch command on the display panel while the vehicle is moving, and C) if the touch command corresponds to one of the actions which are disallowed to the driver then comparing instantaneous fingerprint data captured in response to the touch command with the enrolled fingerprint data and performing the corresponding action only if the instantaneous fingerprint data matches the enrolled passenger fingerprint data.

2. The vehicle apparatus of claim 1, wherein the sensor distinguishes between an arm/hand of the one of the users in the driver seat approaching the display panel and an arm/hand of the one of the users in the passenger seat approaching the display panel.

3. The vehicle apparatus of claim 1, wherein the display panel includes a fingerprint interface integrated into the display panel.

4. The vehicle apparatus of claim 1, wherein the display panel detects fingerprints using an optical detector, a capacitive detector, or an ultrasonic detector.

5. The vehicle apparatus of claim 1, wherein enrolled fingerprints are stored in data memory to compare to instantaneous fingerprint data.

6. The vehicle apparatus of claim 1, wherein enrolled passenger fingerprint data is deleted from data memory when the passenger is no longer present or when the vehicle is shut down.

7. The vehicle apparatus of claim 1 further comprising an occupant sensor, wherein the controller is further configured to unenroll an enrolled fingerprint in response to the occupant sensor.

8. The vehicle apparatus of claim 1, wherein turning the vehicle off unenrolls the enrolled fingerprint.

9. The vehicle apparatus of claim 1, wherein the display panel responds to touch commands of unrestricted functions when the vehicle is in motion.

10. The vehicle apparatus of claim 1, wherein the controller is configured to prompt for a fingerprint enrollment after the vehicle is started and prior to vehicle motion.

11. The vehicle apparatus of claim 1, wherein the controller is configured to allow the one of the users in the passenger seat to enroll a fingerprint during an intermediate stop of the vehicle.

12. A method of controlling functions in a vehicle using a touchscreen, comprising the steps of:
 detecting a passenger seated in a passenger seat before vehicle motion;
 capturing passenger enrollment fingerprint data of the passenger on the touchscreen prior to initiation of vehicle motion;
 capturing instantaneous fingerprint data on the touchscreen when touch commands are performed on the touchscreen by the passenger and by a driver seated in a driver seat to attempt to access the controlled functions, wherein the controlled functions include actions which are disallowed to the driver when the vehicle is moving;
 when a received touch command corresponds to one of the disallowed actions while the vehicle is moving, then activating the controlled function only if the instantaneous fingerprint data matches the passenger enrollment fingerprint data; and
 discontinuing the passenger enrollment fingerprint data in response to the passenger exiting the passenger seat or the vehicle being shut down.

13. The method of claim 12, wherein the passenger is detected sitting and exiting the vehicle using an occupant sensor.

14. The method of claim 12, wherein a detection sensor determines whether a finger touching the touchscreen corresponds to the passenger or the driver during the capturing of enrollment fingerprint data.

15. The method of claim 12, wherein a detection sensor determines whether the touch command corresponds to the passenger or the driver when the touch command corresponds to the disallowed actions while the vehicle is moving.

16. The method of claim 12, wherein passenger enrollment fingerprint data can be captured at temporary and intermediate vehicle stops.

17. The method of claim 12, wherein instantaneous fingerprint data is continuously being monitored while the vehicle is moving.

18. The method of claim 12, wherein the disallowed actions are available to the driver when the vehicle is not in motion.

\* \* \* \* \*